US012731329B2

(12) United States Patent
Li et al.

(10) Patent No.: US 12,731,329 B2
(45) Date of Patent: Sep. 8, 2026

(54) SYSTEMS AND METHODS FOR A SHAPE COMPLETION MODEL

(71) Applicant: Honda Motor Co., Ltd., Tokyo (JP)

(72) Inventors: Hongyu Li, Chestnut Hill, MA (US); Nawid Jamali, San Francisco, CA (US); Soshi Iba, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 632 days.

(21) Appl. No.: 18/086,475

(22) Filed: Dec. 21, 2022

(65) Prior Publication Data

US 2026/0038197 A1 Feb. 5, 2026

(51) Int. Cl.
*G06T 19/20* (2011.01)
*B25J 9/16* (2006.01)
*G06T 7/50* (2017.01)
*G06T 17/00* (2006.01)

(52) U.S. Cl.
CPC ............. *G06T 17/00* (2013.01); *B25J 9/1697* (2013.01); *G06T 7/50* (2017.01); *G06T 2207/10028* (2013.01); *G06T 2207/20084* (2013.01); *G06T 2210/56* (2013.01)

(58) Field of Classification Search
CPC . G06T 17/00; G06T 7/50; G06T 2207/10028; G06T 2207/20084; G06T 2210/56; B25J 9/1697
See application file for complete search history.

(56) References Cited

U.S. PATENT DOCUMENTS 12,322,068 B1 * 6/2025 Kim .......................... G06T 5/60
2020/0167956 A1 5/2020 Herman et al.
2020/0242736 A1 7/2020 Liu et al.
2022/0058827 A1 2/2022 Montserrat et al.
2022/0084241 A1 3/2022 Dikhale et al.
2023/0145048 A1 5/2023 Walker et al.
(Continued)

OTHER PUBLICATIONS

Watkins, David. Learning Mobile Manipulation. Columbia University, 2022. (Year: 2022).*
(Continued)

*Primary Examiner* — Stephen R Koziol
*Assistant Examiner* — Dylan J Sherrillo
(74) *Attorney, Agent, or Firm* — Rankin, Hill & Clark LLP

(57) ABSTRACT

Systems and methods for shape completion are provided. In one embodiment, a computer implemented method includes receiving sensor data for a visualized area of an object as at least one point cloud representation. The computer implemented method also includes transforming the at least one point cloud representation into an input voxel grid of the visualized area of the object. The input voxel grid is a volumetric representation. The computer implemented method further includes encoding the input voxel grid into a partial latent vector that lies on a partial latent space. The computer implemented method yet further includes determining a mapping between the partial latent space and a complete latent space based on the sensor data. The computer implemented method includes predicting a complete latent vector based on the complete latent space. The computer implemented method also includes estimating a complete shape of an object based on the complete latent space.

20 Claims, 6 Drawing Sheets

(56) References Cited

U.S. PATENT DOCUMENTS

2024/0096017 A1* 3/2024 Gao ........................ G06T 15/04
2024/0135721 A1* 4/2024 Ambrus .................... G06T 7/70
2025/0111628 A1 4/2025 Han et al.

OTHER PUBLICATIONS

Mohamed Tahoun, Omar Tahri, Juan Antonio Corrales Ramón, and Youcef Mezouar. Visual-Tactile Fusion for 3D Objects Reconstruction from a Single Depth View and a Single Gripper Touch for Robotics Tasks. In 2021 IEEE/RSJ International Conference on Intelligent Robots and Systems (IROS), pp. 6786-6793, Sep. 2021. doi: 10.1109/IROS51168.2021.9636150. ISSN: 2153-0866.

P. J. Besl and N. D. McKay, "Method for registration of 3-D shapes," in Sensor Fusion IV: Control Paradigms and Data Structures, vol. 1611. SPIE, Apr. 1992, pp. 586-606.

J. Bimbo, S. Luo, K. Althoefer, and H. Liu, "In-Hand Object Pose Estimation Using Covariance-Based Tactile To Geometry Matching," IEEE Robotics and Automation Letters, vol. 1, No. 1, pp. 570-577, Jan. 2016, conference Name: EEE Robotics and Automation Letters.

Y. Cai, K.-Y. Lin, C. Zhang, Q. Wang, X. Wang, and H. Li, "Learning a Structured Latent Space for Unsupervised Point Cloud Completion," 2022, pp. 5543-5553.

B. Calli, A. Singh, A. Walsman, S. Srinivasa, P. Abbeel, and A. M. Dollar, "The YCB object and Model set: Towards common benchmarks for manipulation research," in 2015 International Conference on Advanced Robotics (ICAR), Jul. 2015, pp. 510-517.

Y. F. Chen, M. Everett, M. Liu, and J. P. How, "Socially aware motion planning with deep reinforcement learning," in 2017 IEEE/ RSJ International Conference on Intelligent Robots and Systems (IROS), Sep. 2017, pp. 1343-1350, ISSN: 2153-0866.

H. Chen, P. Wang, F. Wang, W. Tian, L. Xiong, and H. Li, "EPro-PnP: Generalized End-to-End Probabilistic Perspective-N-Points for Monocular Object Pose Estimation," 2022, pp. 2781-2790.

T. Chen, J. Xu, and p. Agrawal, "A System for General In-Hand Object Re-Orientation," in Proceedings of the 5th Conference on Robot Learning. PMLR, Jan. 2022, pp. 297-307, ISSN: 2640-3498.

Epic Games, "Unreal Engine," Apr. 2019.

M. A. Fischler and R. C. Bolles, "Random sample consensus: a paradigm for model fitting with applications to image analysis and automated cartography," Communications of the ACM, vol. 24, No. 6, pp. 381-395, Jun. 1981.

G. Gao, M. Lauri, Y. Wang, X. Hu, J. Zhang, and S. Frintrop, "6D Object Pose Regression via Supervised Learning on Point Clouds," in 2020 IEEE International Conference on Robotics and Automation (ICRA), May 2020, pp. 3643-3649, ISSN: 2577-087X.

A. Geiger, P. Lenz, and R. Urtasun, "Are we ready for autonomous driving? The KITTI vision benchmark suite," in 2012 EEE Conference on Computer Vision and Pattern Recognition, Jun. 2012, pp. 3354-3361, iSSN: 1063-6919.

S. Hinterstoisser, S. Holzer, C. Cagniart, S. llic, K. Konolige, N. Navab, and V. Lepetit, "Multimodal templates for real-time detection of textureless objects in heavily cluttered scenes," in 2011 International Conference on Computer Vision, Nov. 2011, pp. 858-865, ISSN: 2380-7504.

Y. Hu, J. Hugonot, p. Fua, and M. Salzmann, "Segmentation-Driven 6D Object Pose Estimation," 2019, pp. 3385-3394.

Z. Jiang, Y. Zhu, M. Svetlik, K. Fang, and Y. Zhu, "Synergies Between Affordance and Geometry: 6-DoF Grasp Detection via Implicit Representations," Jul. 2021, arXiv:2104.01542 [cs].

H. Li, Z. Li, N. U. Akmandor, H. Jiang, Y. Wang, and T. Padir, "Stereovoxelnet: Real-time obstacle detection based on occupancy voxels from a stereo camera using deep neural networks," in 2023 International Conference on Robotics and Automation (ICRA), May 2023.

Y. Li, G. Wang, X. Ji, Y. Xiang, and D. Fox, "DeepIM: Deep Iterative Matching for 6D Pose Estimation," 2018, pp. 683-698.

K. Park, T. Patten, and M. Vincze, "Pix2Pose: Pixel-Wise Coordinate Regression of Objects for 6D Pose Estimation," 2019, pp. 7668-7677.

C. R. Qi, L. Yi, H. Su, and L. J. Guibas, "PointNet++: Deep Hierarchical Feature Learning on Point Sets in a Metric Space," in Advances in Neural Information Processing Systems, I. Guyon, U. V. Luxburg, S. Bengio, H. Wallach, R. Fergus, S. Vishwanathan, and R. Garnett, Eds., vol. 30. Curran Associates, Inc., 2017.

Y. Qin, H. Su, and X. Wang, "From One Hand to Multiple Hands: Imitation Learning for Dexterous Manipulation from Single-Camera Teleoperation," Apr. 2022, arXiv:2204.12490 [cs].

M. Tatarchenko, A. Dosovitskiy, and T. Brox, "Octree Generating Networks: Efficient Convolutional Architectures for High-Resolution 3D Outputs," in Proceedings of the IEEE International Conference on Computer Vision (ICCV), Oct. 2017.

J. Varley, C. DeChant, A. Richardson, J. Ruales, and P. Allen, "Shape completion enabled robotic grasping," in 2017 IEEE/RSJ International Conference on Intelligent Robots and Systems (IROS), Sep. 2017, pp. 2442-2447, ISSN: 2153-0866.

M. Bauza Villalonga, A. Rodriguez, B. Lim, E. Valls, and T. Sechopoulos, "Tactile Object Pose Estimation from the First Touch with Geometric Contact Rendering," in Proceedings of the 2020 Conference on Robot Learning. PMLR, Oct. 2021, pp. 1015-1029, ISSN: 2640-3498.

G. Wang, F. Manhardt, F. Tombari, and X. Ji, "GDR-Net: Geometry-Guided Direct Regression Network for Monocular 6D Object Pose Estimation," 2021, pp. 16 611-16 621.

H. Wang, S. Sridhar, J. Huang, J. Valentin, S. Song, and L. J. Guibas, "Normalized Object Coordinate Space for Category-Level 6D Object Pose and Size Estimation," 2019, pp. 2642-2651.

S. Wang, J. Wu, X. Sun, W. Yuan, W. T. Freeman, J. B. Tenenbaum, and E. H. Adelson, "3D Shape Perception from Monocular Vision, Touch, and Shape Priors," in 2018 IEEE/RSJ International Conference on Intelligent Robots and Systems (IROS), Oct. 2018, pp. 1606-1613, ISSN: 2153-0866.

Y. Xiang, T. Schmidt, V. Narayanan, and D. Fox, "PoseCNN: A Convolutional Neural Network for 6D Object Pose Estimation in Cluttered Scenes," May 2018, arXiv:1711.00199 [cs].

A. Yamaguchi and C. G. Atkeson, "Recent progress in tactile sensing and sensors for robotic manipulation: can we turn tactile sensing into vision?" Advanced Robotics, vol. 33, No. 14, pp. 661-673, 2019, publisher: Taylor & Francis eprint: https://doi.org/10.1080/01691864.2019.1632222.

J. Zhang, X. Chen, Z. Cai, L. Pan, H. Zhao, S. Yi, C. K. Yeo, B. Dai, and C. C. Loy, "Unsupervised 3D Shape Completion Through GAN Inversion," 2021, pp. 1768-1777.

K. Zhang, Y. Fu, S. Borse, H. Cai, F. Porikli, and X. Wang, "Self-Supervised Geometric Correspondence for Category-Level 6D Object Pose Estimation in the Wild," Oct. 2022, arXiv:2210.07199 [cs].

Q.-Y. Zhou, J. Park, and V. Koltun, "Open3D: A Modern Library for 3D Data Processing," Jan. 2018, arXiv:1801.09847 [cs].

Snehal Dikhale, Karankumar Patel, Daksh Dhingra, Itoshi Naramura, Akinobu Hayashi, Soshi Iba, and Nawid Jamali. Visuo Tactile 6D Pose Estimation of an In-Hand Object Using Vision and Tactile Sensor Data. IEEE Robotics and Automation Letters, 7(2):2148-2155, Apr. 2022. ISSN 2377-3766. doi: 10.1109/LRA.2022.3143289. Conference Name: IEEE Robotics and Automation Letters.

Ian J. Goodfellow, Jean Pouget-Abadie, Mehdi Mirza, Bing Xu, David Warde-Farley, Sherjil Ozair, Aaron Courville, and Yoshua Bengio. Generative Adversarial Networks, Jun. 2014. URL http://arxiv.org/abs/1406.2661. arXiv: 1406.2661 [cs, stat].

Kaiming He, Xiangyu Zhang, Shaoqing Ren, and Jian Sun. Deep Residual Learning for Image Recognition. pp. 770-778, 2016. URL https://openaccess.thecvf.com/content_cvpr_2016/html/He_Deep_Residual_Learning_CVPR_2016_paper.html.

Geoffrey E. Hinton, Nitish Srivastava, Alex Krizhevsky, Ilya Sutskever, and Ruslan R. Salakhutdinov. Improving neural networks by preventing co-adaptation of feature detectors, Jul. 2012. URL http://arxiv.org/abs/1207. 0580. arXiv: 1207.0580 [cs].

Michelle A. Lee, Yuke Zhu, Peter Zachares, Matthew Tan, Krishnan Srinivasan, Silvio Savarese, Li Fei-Fei, Animesh Garg, and Jean-

(56) References Cited

OTHER PUBLICATIONS nette Bohg. Making Sense of Vision and Touch: Learning Multimodal Representations for Contact-Rich Tasks. IEEE Transactions on Robotics, 36(3):582-596, Jun. 2020. ISSN 1941-0468. doi: 10.1109/TRO.2019.2959445. Conference Name: IEEE Transactions on Robotics.

Xudong Mao, Qing Li, Haoran Xie, Raymond Y. K. Lau, Zhen Wang, and Stephen Paul Smolley. Least Squares Generative Adversarial Networks, Apr. 2017. URL http://arxiv.org/abs/1611.04076. arXiv:1611.04076 [cs].

Mehdi Mirza and Simon Osindero. Conditional Generative Adversarial Nets, Nov. 2014. URL http://arxiv.org/abs/1411.1784. arXiv: 1411.1784 [cs, stat].

Chen Wang, Danfei Xu, Yuke Zhu, Roberto Martin-Martin, Cewu Lu, Li Fei-Fei, and Silvio Savarese. DenseFusion: 6D Object Pose Estimation by Iterative Dense Fusion. pp. 3343-3352, 2019. URL https://openaccess.thecvf.com/content_CVPR_2019/html/Wang_DenseFusion_6D_Object_Pose_Estimation_by_Iterative_Dense_Fusion_CVPR_2019_paper.html.

David Watkins-Valls, Jacob Varley, and Peter Allen. Multi-Modal Geometric Learning for Grasping and Manipulation, Feb. 2019. URL http://arxiv.org/abs/1803.07671. arXiv:1803.07671 [cs].

Rundi Wu, Xuelin Chen, Yixin Zhuang, and Baoquan Chen. Multimodal Shape Completion via Conditional Generative Adversarial Networks, Jul. 2020. URL http://arxiv.org/abs/2003.07717. arXiv:2003.07717 [cs].

Office Action of U.S. Appl. No. 18/311,024 dated Dec. 11, 2025, 24 pages.

Liuhao Ge, "Hang PointNet: 3D Hand Pose Estimation using Point Sets", 2018 (Year: 2018).

Ankit Kumar, "Context-aware 6D Pose Estimation of Known Objects using RGB-D data", Dec. 2022 (Year: 2022).

Office Action of U.S. Appl. No. 18/311,024 dated Jul. 31, 2025, 26 pages.

Ho Jin Choi, "Gaussian Process-Based Active Exploration Strategies in Vision and Touch", Jul. 2025 (Year: 2025).

Office Action of U.S. Appl. No. 18/311,024 dated Mar. 19, 2026, 28 pages.

* cited by examiner

SYSTEMS AND METHODS FOR A SHAPE COMPLETION MODEL

BACKGROUND

Manipulation of objects is one of the remaining challenges of robotics. It may be difficult to manipulate an object when the object is not fully visible. For example, when the object is grasped, grasp devices (e.g., end effectuators, fingers, etc.) may occlude the object such that image data of the object is not received for at least a portion of the object. Accordingly, sensor data regarding the shape of the object may be noisy or incomplete and may result in inaccurate models of the object. Attempting to manipulate an object that is only partially modeled may lead to a very poor success rate especially in the presence of noisy and incomplete sensor data, inaccurate models, or a dynamic environment.

BRIEF DESCRIPTION

According to one embodiment, a system for shape completion is provided. The system includes a processor and a memory storing instructions that when executed by the processor cause the processor to receive sensor data for a visualized area of an object as at least one point cloud representation. The instructions also cause the processor to transform the at least one-point cloud representation into an input voxel grid of the visualized area of the object. The input voxel grid is a volumetric representation. The instructions further cause the processor to encode the input voxel grid into a partial latent vector that lies on a partial latent space. The instructions yet further cause the processor to determine a mapping between the partial latent space and a complete latent space based on the sensor data. The instructions cause the processor to predict a complete latent vector based on the complete latent space. The instructions also cause the processor to estimate a complete shape of an object based on the complete latent space. The complete shape includes the visualized area of the object and the occluded area of the object.

According to another embodiment, a computer implemented method for shape completion is provided. The computer implemented method includes receiving sensor data for a visualized area of an object as at least one point cloud representation. The computer implemented method also includes transforming the at least one-point cloud representation into an input voxel grid of the visualized area of the object. The input voxel grid is a volumetric representation. The computer implemented method further includes encoding the input voxel grid into a partial latent vector that lies on a partial latent space. The computer implemented method yet further includes determining a mapping between the partial latent space and a complete latent space based on the sensor data. The computer implemented method includes predicting a complete latent vector based on the complete latent space. The computer implemented method also includes estimating a complete shape of an object based on the complete latent space. The complete shape includes the visualized area of the object and the occluded area of the object.

According to yet another embodiment, a non-transitory computer readable storage medium storing instructions that, when executed by a computer having a processor, cause the computer to perform a method for shape completion is provided. The computer implemented method includes receiving sensor data for a visualized area of an object as at least one point cloud representation. The computer implemented method also includes transforming the at least one-point cloud representation into an input voxel grid of the visualized area of the object. The input voxel grid is a volumetric representation. The computer implemented method further includes encoding the input voxel grid into a partial latent vector that lies on a partial latent space. The computer implemented method yet further includes determining a mapping between the partial latent space and a complete latent space based on the sensor data. The computer implemented method includes predicting a complete latent vector based on the complete latent space. The computer implemented method also includes estimating a complete shape of an object based on the complete latent space. The complete shape includes the visualized area of the object and the occluded area of the object.

DETAILED DESCRIPTION

Figure 1:
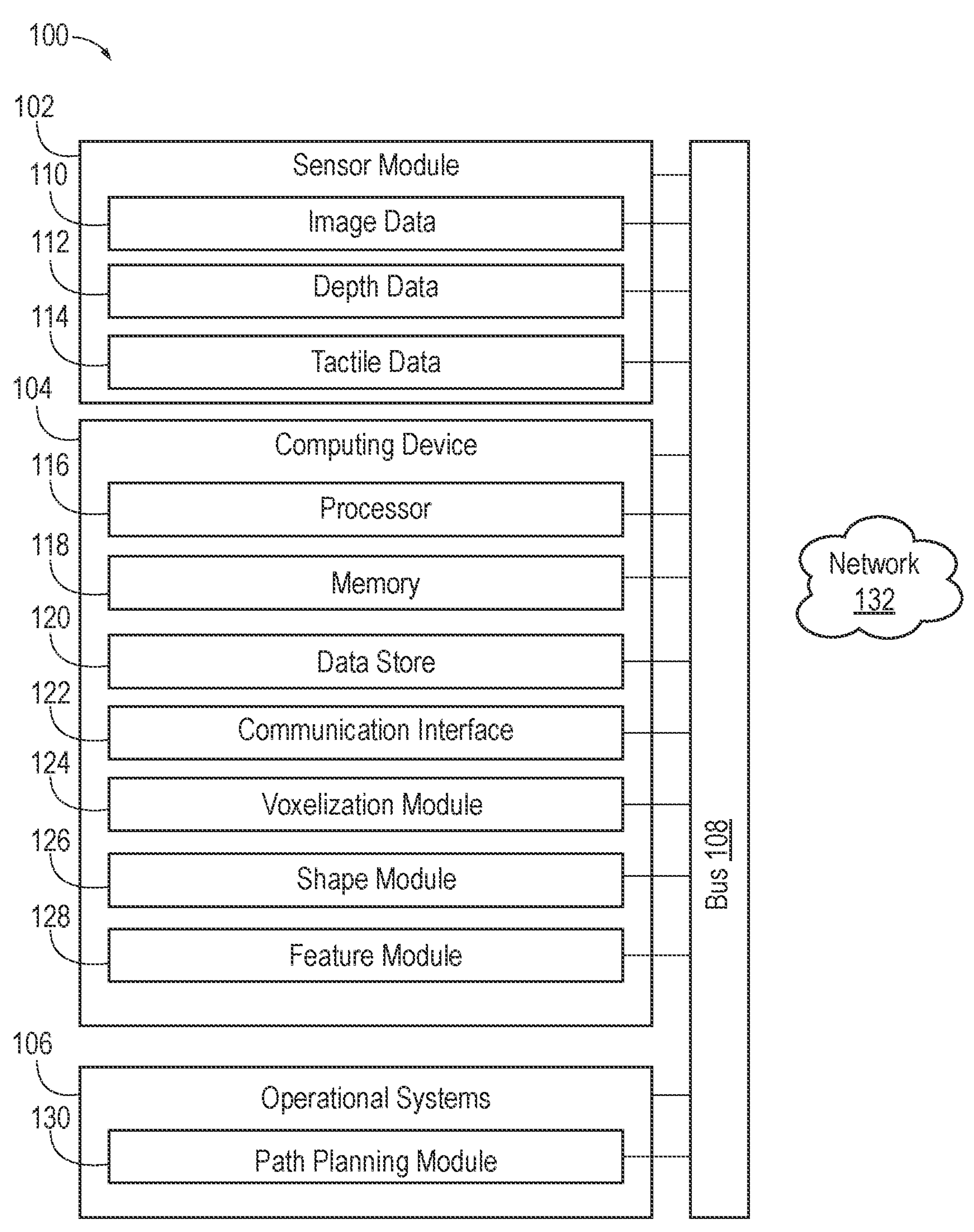
FIG. 1 is an exemplary component diagram of a system for shape completion, according to one aspect.

The systems and methods described herein provide a multi-modal three-dimensional (3D) shape completion model using volumetric representation. We first capture the prior of the object shape using an autoencoder model. The encoder encodes the input voxel occupancy grid to a low-level latent vector that lies on a latent space, and the decoder learns to reconstruct the same voxel grid from the latent vector. We then define the shape completion problem by finding a mapping between the partial latent space and the complete latent space using conditional GAN. Conditioning on the partial latent vector, visual feature, and a Gaussian latent code, the generator predicts the complete latent vector. Ultimately, the complete latent vector is used to estimate the complete shape using the decoder of the trained autoencoder model.

Unlike prior works that consider fixed modality such as point cloud or visuotactile, the shape completion model accepts a wide combination of available sensors such as RGB-D sensor, tactile sensor, LiDAR sensor, etc. Thus, the shape completion model may be applied in various scenarios. For example, the shape completion model may be used in a situation in which the agent itself occludes an object, such as in-hand object shape completion and cluttered object shape completion. The shape completion model may be used for numerous downstream tasks, for example, object 6D pose estimation, grasping, picking and placing, etc.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

“Agent” as used herein is a self-propelled machine that moves through or manipulates an environment. Exemplary agents may include, but is not limited to, robots, vehicles, or other self-propelled machines. The agent may be autonomously, semi-autonomously, or manually operated.

“Agent system,” as used herein may include, but is not limited to, any automatic or manual systems that may be used to enhance the agent, propulsion, and/or operation. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

“Bus,” as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

“Component,” as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

“Computer communication,” as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

“Communication interface” as used herein may include input and/or output devices for receiving input and/or devices for outputting data. The input and/or output may be for controlling different agent features, which include various agent components, systems, and subsystems. Specifically, the term “input device” includes, but is not limited to: keyboard, microphones, pointing and selection devices, cameras, imaging devices, video cards, displays, push buttons, rotary knobs, and the like. The term “input device” additionally includes graphical input controls that take place within a user interface which may be displayed by various types of mechanisms such as software and hardware-based controls, interfaces, touch screens, touch pads or plug and play devices. An “output device” includes, but is not limited to, display devices, and other devices for outputting information and functions.

“Computer-readable medium,” as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

“Database,” as used herein, is used to refer to a table. In other examples, “database” may be used to refer to a set of tables. In still other examples, “database” may refer to a set of data stores and methods for accessing and/or manipulating those data stores. In one embodiment, a database may be stored, for example, at a disk, data store, and/or a memory. A database may be stored locally or remotely and accessed via a network.

“Data store,” as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

“Display,” as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more users and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more users. Further, the term "vehicle" may include vehicles that are automated or non-automated with pre-determined paths or free-moving vehicles.

I. System Overview

Referring now to the drawings, the drawings are for purposes of illustrating one or more exemplary embodiments and not for purposes of limiting the same. FIG. 1 is an exemplary component diagram of an operating environment 100 for a shape completion model, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

The computing device may be implemented as a part of an agent. The agent may be bipedal, two-wheeled, four-wheeled robot, vehicle, or self-propelled machine. The autonomous ego agent may be configured as a humanoid robot. The humanoid robot may take the form of all or a portion of a robot. For example, the humanoid robot may take the form of an arm with fingers. The computing device 104 may be implemented as part of a telematics unit, a head unit, a navigation unit, an infotainment unit, an electronic control unit, among others of an agent. In other embodiments, the components and functions of the computing device 104 may be implemented, for example, with other devices (e.g., a portable device) or another device connected via a network (e.g., a network 132). The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

Figure 2:
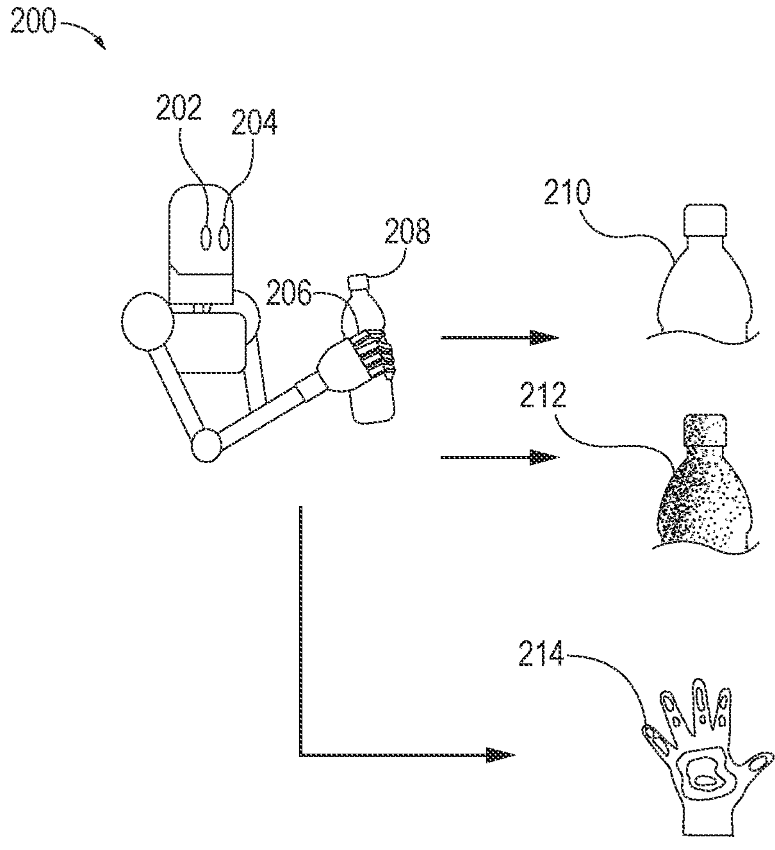
FIG. 2 is an exemplary agent environment of a system shape completion, according to one aspect.

In some embodiments, the ego agent may be the agent 200 shown in FIG. 2. The agent 200 has a number of sensors. For example, the agent 200 including, but not limited to, a first optical sensor 202, a second optical sensor 204, and a force sensor 206. The first optical sensor 202, the second optical sensor 204, and the force sensor 206 receive data from an environment of an object 208. The sensor module 102 receives, provides, and/or senses information associated with the agent 200, an object 208, the operating environment 100, an environment of the agent 200, and/or the operational systems 106. In one embodiment, the sensor module 102 receives image data 110, depth data 112, and tactile data 114 from the sensors. For example, the sensor module 102 may receive image data 110 from the first optical sensor 202, depth data 112 from the second optical sensor 204, and the tactile data 114 from the force sensor 206. The computing device 104 receives the image data 110, the depth data 112, and the tactile data 114 from the sensor module 102. Therefore, the image data 110, depth data 112, and tactile data 114 is raw sensor data received from their respective sensors.

Likewise, the image data 110, depth data 112, and tactile data 114 may include information about the sensors. For example, suppose the force sensor 206 is able to move. The image data 110, depth data 112, and tactile data 114 may include information about the force sensor 206 such as the relative position of the force sensor 206 to a reference point as measured by a sensor. The reference point may be the first optical sensor 202 or the second optical sensor 204. For example, the depth data 112 may include distance measurements from the second optical sensor 204 to the force sensor 206. Likewise, the tactile data 114 may include dimensions (e.g., width, height, length, etc.) of the force sensor 206.

The sensors 202-206 and/or the sensor module 102 are operable to sense a measurement of data associated with the agent 200, the operating environment 100, the object 208, the environment, and/or the operational systems 106 and generate a data signal indicating said measurement of data. These data signals may be converted into other data formats (e.g., numerical) and/or used by the sensor module 102, the computing device 104, and/or the operational systems 106 to generate other data metrics and parameters. In some embodiments, the sensor(s) may receive sensor data as one or more point clouds. It is understood that the sensors may be any type of sensor, for example, acoustic, electric, environmental, optical, imaging, light, pressure, force, thermal, temperature, proximity, gyroscope, and accelerometers, among others. While the sensor 202-206 are described more or fewer sensors may be utilized.

The computing device 104 includes a processor 116, a memory 118, a data store 120, and a communication interface 122, which are each operably connected for computer communication via a bus 108 and/or other wired and wireless technologies. The communication interface 122 provides software and hardware to facilitate data input and output between the components of the computing device 104 and other components, networks, and data sources, which will be described herein. Additionally, the computing device 104 also includes a voxelization module 124, a shape module 126, and a feature module 128, for shape completion facilitated by the components of the operating environment 100.

The voxelization module 124, the shape module 126, and/or the feature module 128 may be an artificial neural network that act as a framework for machine learning, including deep learning. For example, the voxelization module 124, the shape module 126, and/or the feature module 128 may be a convolution neural network (CNN). In one embodiment, the voxelization module 124, the shape module 126, and/or the feature module 128 may be or utilize generative adversarial networks (GANs). In another embodiment, the voxelization module 124, the shape module 126, and/or the feature module 128 may further include or implement concatenator, a deep neural network (DNN), a recurrent neural network (RNN), a 3D Convolutional Neural Network (3DCNN) and/or Convolutional Long-Short Term Memory (ConvLSTM). The voxelization module 124, the shape module 126, and/or the feature module 128 may include an input layer, an output layer, and one or more hidden layers, which may be convolutional filters.

The computing device 104 is also operably connected for computer communication (e.g., via the bus 108 and/or the communication interface 122) to one or more operational systems 106. The operational systems 106 may include, but are not limited to, any automatic or manual systems that may be used to enhance the agent 200, operation, and/or propulsion. The operational systems 106 may dependent on the implementation. For example, the operational system may include a path planning module 130. The path planning module 130 monitors, analyses, operates the device to some degree. As another example, in a vehicular embodiment, the operational systems 106 may include a brake system (not shown), that monitors, analyses, and calculates braking information and facilitates features like anti-lock brake system, a brake assist system, and an automatic brake prefill system. The operational systems 106 also include and/or are operably connected for computer communication to the sensor module 102. For example, one or more sensors of the sensor module 102 may be incorporated with the path planning module 130 to monitor characteristics of the environment or the agent 200.

The sensor module 102, the computing device 104, and/or the operational systems 106 are also operatively connected for computer communication to the network 132. The network 132 is, for example, a data network, the Internet, a wide area network (WAN) or a local area (LAN) network. The network 132 serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Shape Completion

Figure 3:
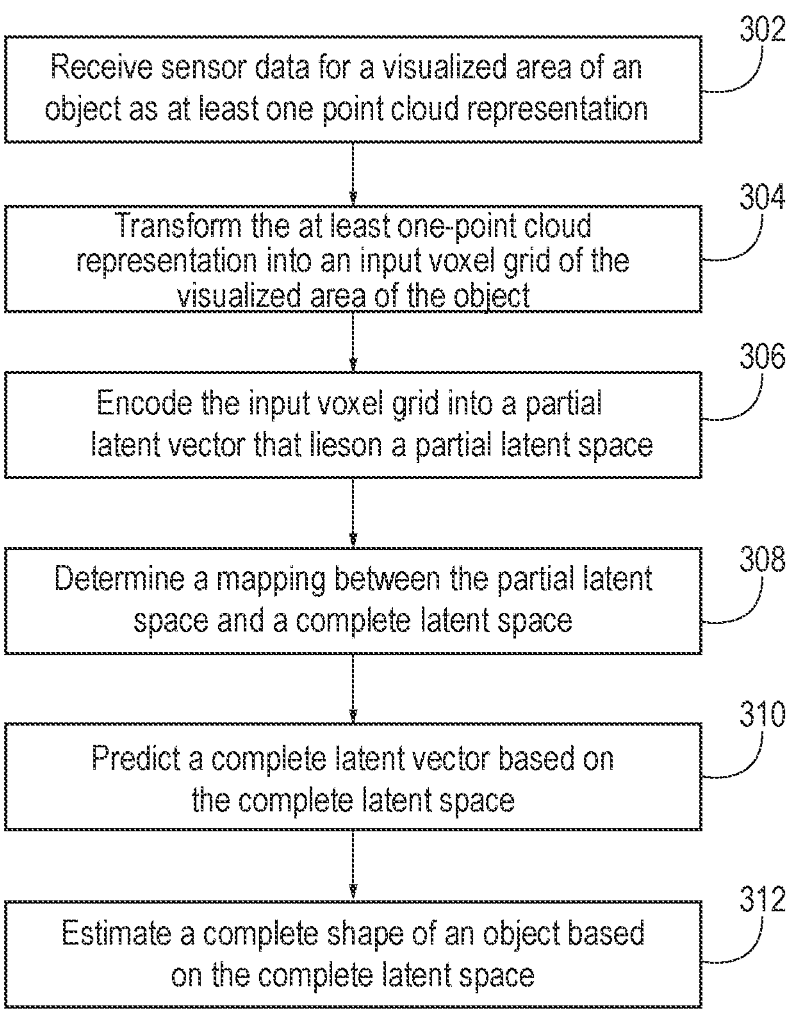
FIG. 3 is an exemplary process flow of a method for shape completion, according to one aspect.
Figure 4A:
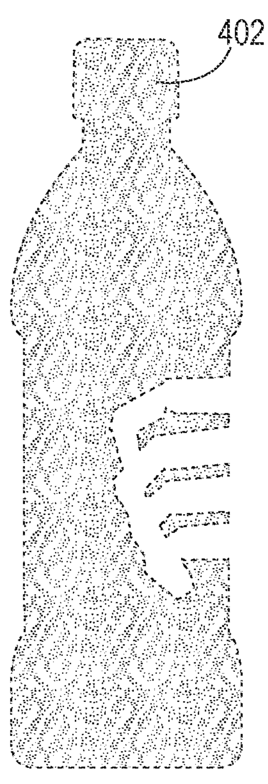
FIG. 4A includes exemplary visualized area for shape completion, according to one aspect.
Figure 4B:
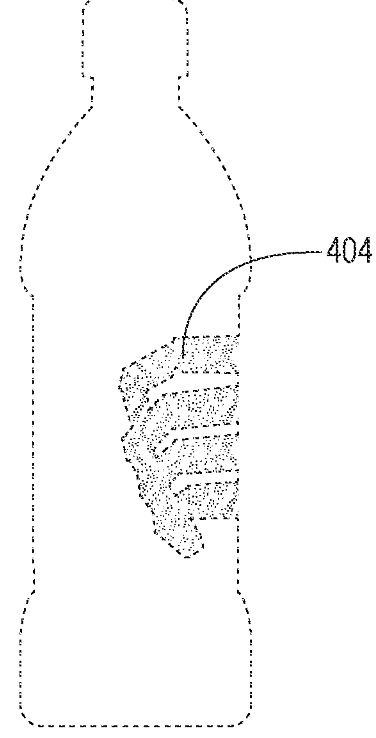
FIG. 4B includes exemplary occluded area for shape completion, according to one aspect.
Figure 5:
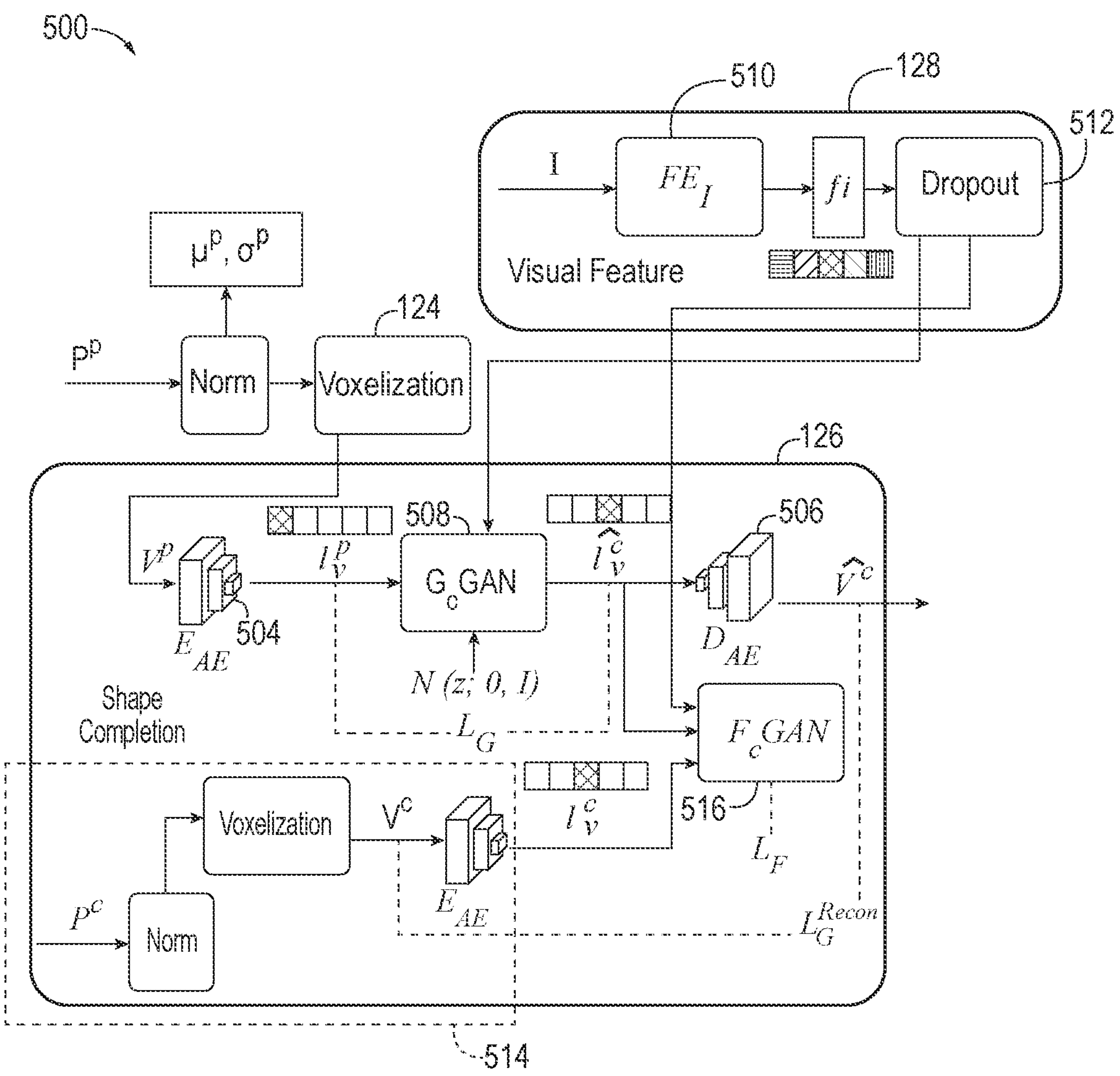
FIG. 5 is an exemplary network architecture of a system for shape completion, according to one aspect.

Referring now to FIG. 3, a method 300 for visuo-tactile object pose estimation will now be described according to an exemplary embodiment. FIG. 3 will also be described with reference to FIGS. 1, 2, 4A, 4B, 5, and 6. For simplicity, the method 300 will be described as a sequence of elements, but it is understood that the elements of the method 300 may be organized into different architectures, blocks, stages, and/or processes.

At block 302, the method 300 includes the sensor module 102 receiving sensor data of an object 208 as at least one point cloud representation. The sensor data is associated with a visualized area 402 of the object 208, shown in FIG. 4A. The visualized area 402 includes the surface of the object 208 that may be perceived by the sensors, such as the first optical sensor 202, the second optical sensor 204, and/or the force sensor 206 as will be discussed in greater detail below.

The sensor data may include image data 110 received from the first optical sensor 202. The image data 110 may include a video sequence or a series of images, user inputs, and/or data from the operational systems 106. The image data 110 may be received from the first optical sensor 202. The first optical sensor 202 may include radar units, lidar units, image capture components, sensors, cameras, scanners (e.g., 2-D scanners or 3-D scanners), or other measurement components. In some embodiments, the image data 110 is augmented as additional sensor data from other sources is received. For example, the image data 110 from the first optical sensor 202 may be augmented by other sources, such as the second optical sensor 204, and/or remote devices (e.g., via the bus 108 and/or the communication interface 122).

The image data 110 corresponds to the visualized area 402 of the object 208 that is not occluded by the agent 200 or the environment. For example, as shown in FIG. 2, the agent 200 is holding an object 208, shown here as a bottle, with a force sensor 206 represented by the hand of the agent 200. Suppose the image data 110 may be image data, such as RGB data, YCB data, and/or YUV data. The image data 110 may include or be used to construct a visualized dataset 210 of the portion of the object 208 that may be assessed by the first optical sensor 202. The visualized dataset 210 may be a color image corresponding to the image data 110 visible by the first optical sensor 202. Therefore, the occluded area 404 of the object 208, shown in FIG. 4B, that is occluded by the force sensor 206 may not be represented in the visualized dataset 210.

The sensor data may also include receiving depth data 112 about the object 208 in the environment. The depth data 112 may be received from the second optical sensor 204. The depth data 112 may be augmented as additional sensor data from other sources is received. The depth data 112 may also correspond to visualized area 402 of the object 208. The depth data 112 contains information relating to the distance of the surfaces of the object 208 from a viewpoint, such as the agent 200 or the second optical sensor 204. For example, the depth data 112 may include the distance between the object 208 and the second optical sensor 204 as computed by the voxelization module 124. The depth point cloud incudes the distances as a set of data points that represent the 3D shape of the object 208. The depth data 112 may include or be used to construct a depth dataset 212 of the portion of the object 208 that may be assessed by the second optical sensor 204. Accordingly, the portion of the object 208 occluded by the force sensor 206 may not be represented in the depth dataset 212 of the object 208.

The sensor data may include 102 receiving tactile data 114 about the object 208. The tactile data 114 may include pressure mapping, force mapping, user inputs, and/or data from the operational systems 106. In some embodiments, the sensor module 102 may receive the tactile data 114 may include a surface estimate of the object 208 as a point cloud that includes shape data. The tactile data 114 may correspond to the visualized area 402 the object 208, for example, if the object is occluded by another object or the environment. Accordingly, the tactile data 114 may provide additional data about the object 208 that may not be captured by the first optical sensor 202 and/or the second optical sensor 204. Because the tactile data 114 is based on contact with the object 208, the tactile dataset 214 may not include information about portions of the object 208 not in contact with the agent 200. Instead, the tactile data 114 supplements the visualized dataset 210 and/or the depth dataset 212. The tactile data 114 may be received from the force sensor 206. The force sensor 206 may include tensile force sensors, compressions force sensors, tensile and force compression sensors, or other measurement components. The force sensor 206 may be with a Weiss gripper with GelSight tactile sensors.

For clarity, the method 300 is described with respect to a single object 208. However, the image data 110 and the depth data 112 may be associated with one or more objects. Accordingly, the agent 200 may detect or identify one or more of the entities, objects, obstacles, hazards, and/or corresponding attributes or characteristics a position or a location associated with the object 208 as well as other objects. Likewise, the described sensors 202-206, such as the force sensor 206, may include a single sensor or an array of sensors.

The sensor data may be received in the form of at least one point cloud representation. For example, the sensor data may include an image point cloud, $p_c$, 210 from the first optical sensor 202, a depth point cloud, $p_l$, 212 from the second optical sensor 204, and/or a tactile point cloud, $p_t$, 214 from the force sensor 206, and so on. Due to the occlusion of the occluded area 404, the sensor data represents the visualized area 402. Therefore, the set of sensor data does not represent a complete point cloud, $p^c$, but rather a partial point cloud, $p^p$, such that $p^p \triangleq \{p_c \cup p_l \cup p_t \ldots\}$.

In one embodiment, the at least one point cloud representation may be normalized based on a centroid of the at least one point cloud representation and a farthest distance of the at least one point cloud representation from the centroid. For example the at least one point cloud representation may be normalized first by inputting the partial point cloud representation $p^p$ using its centroid, $\mu^p \in \mathbb{R}^{3\times 1}{}^{3\times 1}$ and its farthest distance from the centroid $\sigma^p \in \mathbb{R}$.

Returning to FIG. 3, at block 304 the method 300 includes the voxelization module 124 transforming the at least one-point cloud representation into an input voxel grid of the visualized area of the object. The input voxel grid is a volumetric representation. The voxelization module 124 may transform the at least one point cloud using a voxelization operation, shown in the network architecture 500 of FIG. 5, such that $V^p$=Voxelization($P^p$). In one embodiment the normalized point cloud is voxelized as $V^p$.

At block 306, the method 300 includes the shape module 126 encoding the input voxel grid into a partial latent vector that lies on a partial latent space, $M_p$. The shape module 126 may include an autoencoder having an encoder, $E_{AE}$, 504 and a decoder, $D_{AE}$, 506. The encoder, ELE, 504 encodes the input voxel occupancy grid $V \in \mathbb{R}^{n_x \times n_y \times n_z}$ into a latent vector $l_v \in \mathbb{R}^{n_l}$. For example, the encoder, $E_{AE}$, 504, may use a set of 3D convolutional layers to encode the input voxel grid into a partial latent vector. The decoder, $D_{AE}$, 506 recovers the input voxel grid from the latent vector $l_v$. For example, the decoder, $D_{AE}$, 506 may use symmetrical 3D deconvolutional layers. In some embodiments, Batch Normalization layers may be applied after the convolutional layers, followed by a ReLU activation function. The latent vectors $l_v$ lies on the latent space $M_c$. Values, such as $n_x = n_y = n_z = 32$ and $n_l$=128 empirically. The autoencoder model may be optimized using a Jaccard index loss:

$$\mathcal{L}_{AE} = 1 - E_{V^c \sim p(V^c)} \frac{|V^c \cap D_{AE}(E_{AE}(V^c))|}{|V^c \cup D_{AE}(E_{AE}(V^c))|}$$

At block 308, the method 300 includes the shape module 126 determining a mapping between the partial latent space, $M^p$, and a complete latent space, $M^c$, based on the sensor data. The shape module 126 may determine mapping using a generator 508. The mapping may be based on visual features extracted from the sensor data. In some embodiments, one or more visual features $f_i$ is input as a conditional input for the generator 508 to complete the visualized area 402. For example, the one or more visual features $f_i$ may be extracted from the sensor data using a pretrained ResNet feature extractor 510. To reduce the simulation to real gap and enforce the regularization, a Dropout layer 512 randomly drops a percentage of the visual feature information, for example, 50% of the visual feature information. Hence, along with a Gaussian-sampled latent z~N(0, 1), the generator 508 is trained as $G_{cGAN}: (M^p, z, f_i) \mapsto M^c$.

At block 310, the method 300 includes the shape module 126 predicting a complete latent vector, $\hat{l}_v^c$, based on the complete latent space. The generator 508 predicts the complete latent vector $\hat{l}_v^c \in M^c$. In some embodiments, the predicted complete latent vector, $\hat{l}_v^c$, is compared to the ground truth $$l_v^c.$$

The predicted complete latent vector is passed to a discriminator with a ground-truth complete latent vector $$l_v^c$$

by applying the procedure on the ground-truth complete point cloud $P^c$. The discriminator F 516 may be a binary classifier that may distinguish between the ground truth $$l_v^c$$

and the predicted $\hat{l}_v^c$ (as 0).

At block 312, the method 300 includes the shape module 126 estimating a complete shape, $\hat{V^c}$, of an object based on the complete latent space. The complete shape, $\hat{V^c}$, includes the visualized area 402 of the object and the occluded area 404 of the object 208. The decoder, $D_{AE}$, 506 recovers a complete shape based on the latent space $M^c$. In one embodiment, $\hat{l}_v^c \in M^c$ is fed to the decoder, $D_{AE}$, 506 to obtain the estimated complete shape $\hat{V^c}$. In this manner, the agent may determine a complete shape of the object 208 even if the object is occluded. This allows the agent 200 to better path plan in the environment using the path planning module 130 by modeling the complete object 208. For example, the agent 200 may better determine how to grasp or transport the object. Thus, the system and methods described may be applied various scenarios, such as the most common self-occluded object shape completion, in-hand object shape completion, and cluttered object shape completion.

In some embodiments, the shape module 126 may be trained using a training autoencoder 514. For example, optimization may be performed for the shape module 126 using loss calculations. The loss calculations may include a discriminator loss $\mathcal{L}_F$, a generator loss $\mathcal{L}_G$, and a reconstruction loss $\mathcal{L}_G^{Recon}$.. The discriminator 516 is penalized when the ground truth $$l_v^c$$

and the predicted $\hat{l}_v^c$ are not distinguished. The loss functions are leveraged via training $$\mathcal{L}_F = \mathbb{E}_{V^c \sim p(V^c)}[F_{cGAN}(E_{AE}(V^c)) - 1]^2 + \mathbb{E}_{V^p \sim p(V^p), z \sim p(z), f_i \sim p(f_i)}[F_{cGAN}(G_{cGAN}(E_{AE}(V^p), z, f_i))]^2$$

$$\mathcal{L}_G = \mathbb{E}_{V^p \sim p(V^p), z \sim p(z), f_i \sim p(f_i)}[F_{cGAN}(G_{cGAN}(E_{AE}(V^p), z, f_i)) - 1]^2$$

In one embodiment, to further stabilize the cGAN training and guide the model to finer results, the reconstruction loss $\mathcal{L}_G^{Recon}$ is introduced that directly measures the differences between the ground-truth complete shape $V^c$ and the estimated complete shape $V^c \triangleq D_{AE}(G_{cGAN}(E_{AE}(V^p), z, f_i))$ using a Jaccard index loss:

$$\mathcal{L}_G^{Recon} = 1 - \mathbb{E}_{V^p \sim p(V^p), z \sim p(z), f_i \sim p(f_i)} \frac{|V^c \cap \hat{V^c}|}{|V^c \cup \hat{V^c}|}$$

In this manner the shape module 126 may be trained according to:

$$\underset{G}{\operatorname{argmin}}\ \underset{F}{\operatorname{argmax}}\ \mathcal{L}_F + \mathcal{L}_G + \alpha L_G^{Recon}$$

where α is the weight for the reconstruction loss. For example, the reconstruction loss may be set such that α=30. In this manner, the shape module 126 may be trained using known information about the ground-truth of the object 208 using the training autoencoder 514 which is then fed to the discriminator 516.

Figure 6:
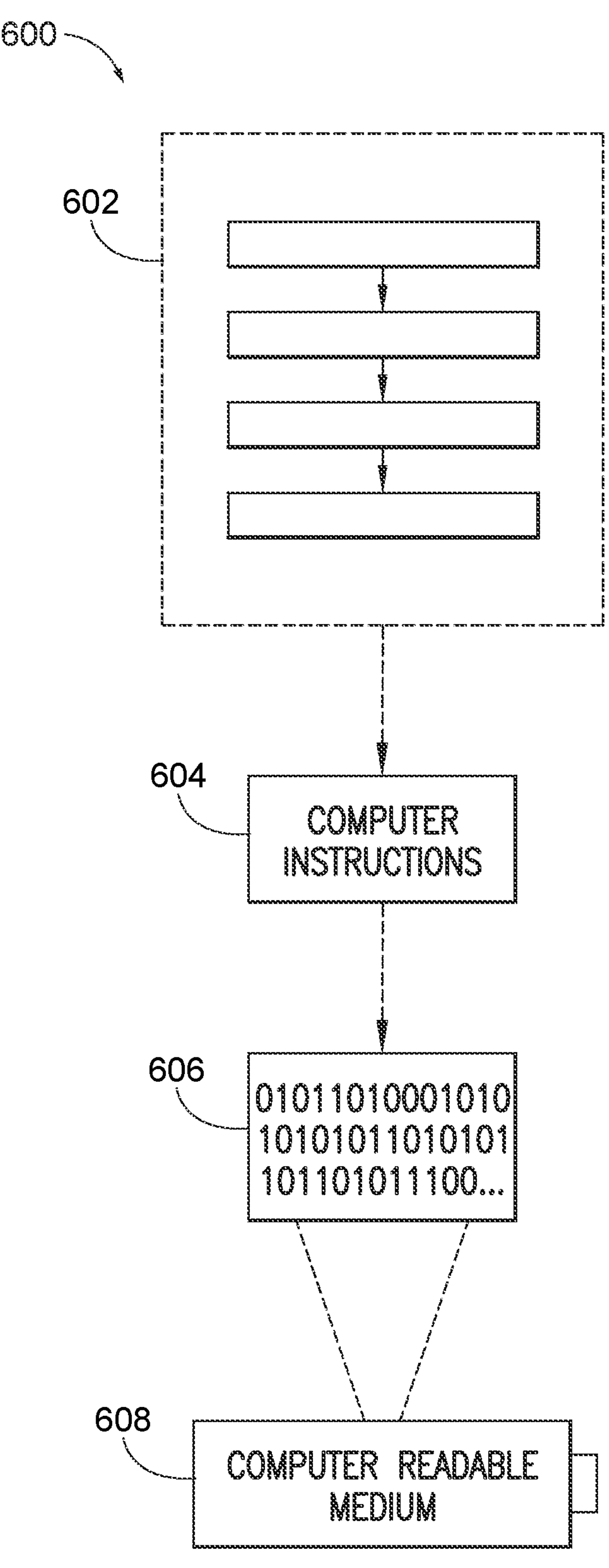
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein.

In this implementation 600, the processor-executable computer instructions 604 may be configured to perform a method 602, such as the method 300 of FIG. 3. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for shape completion, comprising:
- a processor, and
- a memory storing instructions that when executed by the processor cause the processor to:
- receive sensor data for a visualized area of an object as at least one point cloud representation;
- transform the at least one point cloud representation into an input voxel grid of the visualized area of the object, wherein the input voxel grid is a volumetric representation;
- encode the input voxel grid into a partial latent vector that lies on a partial latent space;
- extract visual features from the sensor data;
- input the partial latent vector, the visual features, and a Gaussian latent code into a conditional generative model;
- generate, by the conditional generative model, a complete latent vector in a complete latent space; and
- decode, by a decoder of an autoencoder and using the generated complete latent vector as input to the decoder, a voxel representation of the object, wherein the reconstructed object includes the visualized area of the object and a previously occluded portion of the object.

2. The system of claim 1, wherein the mapping is further based on visual features extracted from the sensor data.

3. The system of claim 2, wherein the system of claim 1 includes an autoencoder having a generator, and wherein visual features of the sensor data are input into the generator as conditional input, the generator being part of the conditional generative model.

4. The system of claim 1, wherein the system of claim 1 includes an autoencoder having an encoder to encode the input voxel grid and a decoder to estimate the complete shape, wherein the encoder generates the partial latent vector and the decoder reconstructs the voxel representation of the object.

5. The system of claim 4, wherein the autoencoder is optimized by minimizing Jaccard index loss between reconstructed voxel grids and ground truth voxel grids.

6. The system of claim 1, wherein the input voxel grid is encoded into the partial latent vector using a set of three-dimensional convolutional layers.

7. The system of claim 1, wherein the at least one point cloud representation is normalized based on a centroid of the at least one point cloud representation and a farthest distance of the at least one point cloud representation from the centroid.

8. A computer implemented method for shape completion, comprising:
- receiving sensor data from an agent for a visualized area of an object as at least one point cloud representation;
- transforming the at least one point cloud representation into an input voxel grid of the visualized area of the object, wherein the input voxel grid is a volumetric representation;
- encoding the input voxel grid into a partial latent vector that lies on a partial latent space;
- determining a mapping between the partial latent space and a complete latent space based on the sensor data;
- generating a complete latent vector representing the object based on the mapping; and
- decoding the complete latent vector to reconstruct a voxel representation of the object, wherein the reconstructed object includes the visualized area of the object and a previously occluded portion of the object.

9. The computer implemented method of claim 8, wherein the mapping is based on visual features extracted from the sensor data.

10. The computer implemented method of claim 8, further comprising extracting visual features from the sensor data, wherein the generating the complete latent vector is further based on the extracted visual features as conditional input.

11. The computer implemented method of claim 8, further comprising performing optimization by minimizing Jaccard index loss.

12. The computer implemented method of claim 8, wherein the input voxel grid is encoded into the partial latent vector using a set of three-dimensional convolutional layers.

13. The computer implemented method of claim 8, wherein the at least one point cloud representation is normalized based on a centroid of the at least one point cloud representation and a farthest distance of the at least one point cloud representation from the centroid.

14. The computer implemented method of claim 8, wherein the voxel representation is used for object shape completion in a scenario including one or more of self-occluded object shape completion, in-hand object shape completion, and cluttered object shape completion by the agent.

15. A non-transitory computer readable storage medium storing instructions that when executed by a computer having a processor to perform a method for shape completion, the method comprising:

receiving sensor data for a visualized area of an object as at least one point cloud representation;

transforming the at least one point cloud representation into an input voxel grid of the visualized area of the object, wherein the input voxel grid is a volumetric representation;

encoding the input voxel grid into a partial latent vector that lies on a partial latent space;

determining a mapping between the partial latent space and a complete latent space based on the sensor data;

generating a complete latent vector representing the object based on the mapping; and decoding the complete latent vector to reconstruct a voxel representation of the object, wherein the reconstructed object includes the visualized area of the object and a previously occluded portion of the object.

16. The non-transitory computer readable storage medium of claim 15, wherein the mapping is based on visual features extracted from the sensor data.

17. The non-transitory computer readable storage medium of claim 15, the method further comprising extracting visual features from the sensor data, wherein the generating the complete latent vector is further based on the visual features as conditional input.

18. The non-transitory computer readable storage medium of claim 15, the method further comprising performing optimization by minimizing Jaccard index loss.

19. The non-transitory computer readable storage medium of claim 15, wherein the input voxel grid is encoded into the partial latent vector using a set of three-dimensional convolutional layers.

20. The non-transitory computer readable storage medium of claim 15, wherein the at least one point cloud representation is normalized based on a centroid of the at least one point cloud representation and a farthest distance of the at least one point cloud representation from the centroid.

* * * * *